US012654838B2

(12) United States Patent
Family et al.

(10) Patent No.: US 12,654,838 B2
(45) Date of Patent: Jun. 16, 2026

(54) FAIRING FOR FOLDING WING TIP

(71) Applicant: Airbus Operations Limited, Bristol (GB)

(72) Inventors: Oliver Family, Bristol (GB); Robert Mills, Bristol (GB); Christopher Gray, Bristol (GB); Thomas Wilson, Bristol (GB)

(73) Assignee: Airbus Operations Limited, Bristol (GB)

( * ) Notice: Subject to any disclaimer, the term of this patent is extended or adjusted under 35 U.S.C. 154(b) by 75 days.

(21) Appl. No.: 18/458,814

(22) Filed: Aug. 30, 2023

(65) Prior Publication Data

US 2024/0067326 A1 Feb. 29, 2024

(30) Foreign Application Priority Data

Aug. 31, 2022 (GB) ..................................... 2212676

(51) Int. Cl.
B64C 3/56 (2006.01)
B64C 23/06 (2006.01)

(52) U.S. Cl.
CPC .............. B64C 3/56 (2013.01); B64C 23/072 (2017.05)

(58) Field of Classification Search
CPC .................................. B64C 3/56; B64C 23/072
See application file for complete search history.

(56) References Cited

U.S. PATENT DOCUMENTS

| | | | | | |
|---|---|---|---|---|---|
| 2,925,233 | A | * | 2/1960 | Dunn | B64C 3/42 |
| | | | | | 49/249 |
| 3,936,013 | A | * | 2/1976 | Yuan | B64C 23/065 |
| | | | | | 416/228 |
| 4,093,156 | A | * | 6/1978 | Coe, Jr. | B64C 30/00 |
| | | | | | 244/46 |

(Continued)

FOREIGN PATENT DOCUMENTS

| | | |
|---|---|---|
| CN | 105 438 443 A | 3/2016 |
| CN | 106184711 A | 12/2016 |

(Continued)

OTHER PUBLICATIONS

Boeing 777X, Wikipedia, retrieved on Aug. 30, 2023 from <https://en.wikipedia.org/wiki/Boeing_777X>, 27 pages.

(Continued)

*Primary Examiner* — Joshua J Michener
*Assistant Examiner* — Cindi M Curry
(74) *Attorney, Agent, or Firm* — Nixon & Vanderhye, PC

(57) ABSTRACT

An aircraft wing is disclosed having a main fixed wing portion and a wing tip device at a tip thereof. The wing tip device is configurable between a flight configuration and a ground configuration, in which ground configuration the wing tip device is moved away from the flight configuration such that the span of the aircraft wing is reduced. A hinge arrangement connects the main fixed wing portion and the wing tip device and enables the wing tip device to rotate between the ground configuration and the flight configuration. The hinge arrangement protrudes beyond an outer surface of the main fixed wing portion and wing tip device. A fairing covers at least part of the hinge arrangement on at least a suction side of the wing.

16 Claims, 3 Drawing Sheets

(56) References Cited

U.S. PATENT DOCUMENTS

| | | | | |
|---|---|---|---|---|
| 5,372,336 A * | 12/1994 | Paez | .......................... | B64C 3/56 |
| | | | | 244/49 |
| 5,452,643 A * | 9/1995 | Smith | ....................... | B64C 3/56 |
| | | | | 91/416 |
| 6,409,126 B1 | 6/2002 | Cunningham, Jr. | | |
| 11,738,854 B2 * | 8/2023 | Lowry | ...................... | B64C 7/00 |
| | | | | 244/199.4 |
| 2001/0028019 A1 * | 10/2001 | Cambon | ................ | B64D 29/02 |
| | | | | 244/54 |
| 2009/0314898 A1 | 12/2009 | Ferrari | | |
| 2014/0117151 A1 * | 5/2014 | Fox | ........................... | B64C 3/56 |
| | | | | 244/49 |
| 2014/0117158 A1 * | 5/2014 | Davies | ................... | B64C 23/065 |
| | | | | 244/123.1 |
| 2023/0257099 A1 * | 8/2023 | Walega | ..................... | B64C 3/56 |
| | | | | 244/49 |
| 2024/0417061 A1 * | 12/2024 | Wilson | ...................... | B64C 3/56 |

FOREIGN PATENT DOCUMENTS

| | | | |
|---|---|---|---|
| CN | 217049018 U | 7/2022 |
| CN | 115465439 A | 12/2022 |
| DE | 888 367 C | 8/1953 |
| GB | 2 583 500 A | 11/2020 |
| WO | 2005099380 A2 | 10/2005 |
| WO | 2020157445 A1 | 8/2020 |

OTHER PUBLICATIONS

North American XB-70 Valkyrie, Wikipedia, retrieved on Aug. 30, 2023 from <https://en.wikipedia.org/wiki/ North_American_XB-70_Valkyrie>, 20 pages.

Combined Search and Examination Report for Application No. GB2212676.7 dated Feb. 27, 2023, 6 pages.

Extended European Search Report for Application No. EP 23191352. 6, six pages, dated Dec. 14, 2023.

* cited by examiner

FAIRING FOR FOLDING WING TIP

CROSS RELATED APPLICATION

This application claims priority to United Kingdom Patent Application GB 2212676.7, filed Aug. 31, 2022, the entire contents of which is hereby incorporated by reference.

FIELD OF THE INVENTION

The present invention relates to an aircraft wing with a folding wing tip having a hinge arrangement with a fairing.

BACKGROUND OF THE INVENTION

There is a trend towards increasingly large wing spans for passenger aircraft in order to improve efficiency. However, the maximum aircraft span is effectively limited by airport operating rules which govern various clearances required when manoeuvring around the airport (such as the span and/or ground clearance required for gate entry and safe taxi way usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

The folding wing tip device may be connected to a fixed wing via a hinge arrangement. The hinge arrangement may be fully within the wing profile so as to not impact the aerodynamic performance of the wing. However, the hinge arrangement may need to protrude beyond an outer surface of the fixed wing and wing tip device, resulting in a need for a fairing to cover the exposed section of the hinge arrangement in order that the aerodynamic performance of the wing is not adversely affected.

WO 2020/157445 A teaches one such fairing for a folding wing tip in which the wing tip device is configured to rotate downwardly about a hinge arrangement from the flight configuration to the ground configuration. The upper (suction) surface of the wing is substantially uninterrupted and the fairing is on the lower (pressure) surface of the wing. The hinge arrangement has a hinge axis aligned with the line of flight, and the fairing extends from the leading edge of the wing with a minimum cross sectional profile to minimise or eliminate any lift loss typically associated with a wing fairing.

However, downward folding wing tip devices suffer a number of problems, in particular the folding wing tip device span is constrained by ground clearance when the aircraft is on the ground.

For transonic aircraft, such as a typical jet transport aircraft, where the wing is configured to experience transonic flow over the wing when in the flight configuration, significantly increasing the wing span with a folding wing tip may be particularly beneficial.

The present invention seeks to provide an improved fairing for a folding wing tip.

SUMMARY OF THE INVENTION

A first aspect of the invention provides an aircraft wing comprising a main fixed wing portion and a wing tip device at a tip thereof, wherein the wing tip device is configurable between a flight configuration and a ground configuration, in which ground configuration the wing tip device is moved away from the flight configuration such that the span of the aircraft wing is reduced, the aircraft wing further comprising: a hinge arrangement connecting the main fixed wing portion and the wing tip device and for enabling the wing tip device to rotate between the ground configuration and the flight configuration, wherein the hinge arrangement protrudes beyond an outer surface of the main fixed wing portion and wing tip device; and a fairing covering at least part of the hinge arrangement on at least a suction side of the wing.

The hinge arrangement and fairing protrude beyond the outer surface of the wing on the suction side of the wing. The invention is advantageous in that the fairing in this location can be shaped to provide an aerodynamic benefit, and not just minimising the fairing size as much as possible.

The hinge arrangement may include a plurality of knuckles fixed to the fixed wing, and a plurality of knuckles fixed to the wing tip device, the knuckles protruding beyond an outer surface of the main fixed wing portion and wing tip device and having an exposed outer aerodynamic surface.

The fairing may form a smooth outer aerodynamic surface with the knuckles.

The fairing may protrude beyond an outer surface of the main fixed wing portion and wing tip device on both the suction side and a pressure side of the wing.

The aircraft wing may be a swept transonic wing configured to experience transonic flow over the wing when in the flight configuration. Typically, a transonic wing is operable below Mach 1.2.

The main fixed wing portion may have a straight swept leading edge. The wing tip device may have a straight swept leading edge with the same sweep angle as the main fixed wing portion.

The wing tip device may be planar. By planar it is meant that the chords at different sections of the wing tip device lie generally in a plane. The plane of the wing tip device may be co-planar with a plane of the main fixed wing portion when in the flight configuration.

The wing tip device may have a straight leading edge up to a tip of the wing tip device. Save for a slight radius at the tip of the wing tip device, the straight leading edge may extend up to the tip of the wing tip device without tip rounding, or a raked or kinked wing tip.

The wing tip device may have a span and the span of the wing tip device may be at least 15% of a total span of the aircraft wing, preferably at least 20%, preferably at least 25%, preferably at least 30%.

The fairing may be shaped to i) create a vortex to energise flow and/or ii) reduce outboard spanwise flow over the wing tip device adjacent the fairing.

The fairing may have a generally carrot shaped body, an inboard portion extending from the carrot shaped body to the main fixed wing portion, and an outboard portion extending from the carrot shaped body to the wing tip device.

The carrot shaped body of the fairing may have a forward portion which extends forward of the leading edge of the fixed wing and wing tip device.

The forward portion of the fairing may be generally conical. The forward portion of the fairing may extend further forward than necessary for streamwise flow to accommodate the hinge arrangement.

The outboard portion of the fairing may meet an upper surface of the wing tip device along a line generally aligned with a line of flight direction.

The carrot shaped body of the fairing may have a rear portion which extends beyond the trailing edge of the fixed wing and wing tip device and/or wherein the inboard portion of the fairing extends beyond the trailing edge of the fixed wing and/or wherein the outboard portion of the fairing extends beyond the trailing edge of the fixed wing.

The inboard and/or outboard portions of the fairing may taper in decreasing span-wise width as they extend away from the trailing edge of the fixed wing and wing tip device.

The outboard portion of the fairing may have a trailing edge which extends in a straight line from the trailing edge of the wing tip device at the intersection of the outboard portion of the fairing with the upper surface of the wing tip device up to a rearmost end of the carrot shaped body.

The aircraft wing may further comprise a leading edge strake between the wing tip device leading edge and the forward portion of the fairing.

The hinge arrangement may have a hinge line. The hinge line may be at a non-zero angle to the wing chord at the tip of the main fixed wing portion, preferably the angle is at least 5 degrees, or at least 10 degrees, or at least 15 degrees. The hinge line may be angled to be inclined inboard in the wing spanwise direction from leading edge to trailing edge of the wing. Alternatively, the hinge line may be aligned with the line of flight.

The fairing may be shaped to be asymmetric in planform view with respect to the hinge line.

The fairing asymmetry may comprise a larger volume enclosed by the fairing outer surface on the wing tip device side of the fairing than on the main fixed wing portion side of the fairing.

The hinge arrangement may be configured to enable the wing tip device to be rotated upwardly with respect to the main fixed wing portion when moving from the flight configuration to the ground configuration.

The hinge arrangement may be lockable in the flight configuration. The hinge arrangement may be configured to be unlocked from a locked condition when in the flight configuration to enable the wing tip device to move passively under aerodynamic load.

When this unlocked condition of the hinge arrangement is activated in the flight configuration and used in combination with a flared or inclined hinge line the wing tip device may be used for semi aeroelastic purposes. That is to say, a gust load may cause the wing tip device to fold upwardly which, due to the inclined hinge line, has the effect of reducing the angle of attack of the wing tip device. The aerodynamically unloaded wing tip device can then passively rotate downwardly towards the flight configuration.

The aircraft wing may further comprise a motor for rotating the wing tip device with respect to the main fixed wing portion on the hinge arrangement.

The wing tip device may have no leading edge high lift device.

The aircraft wing may further comprise a vortex generator 20 mounted on the fairing.

The fairing may have a shape which generates a profile drag greater than a smallest profile drag possible under the same flow conditions for a fairing sized to accommodate the hinge arrangement.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
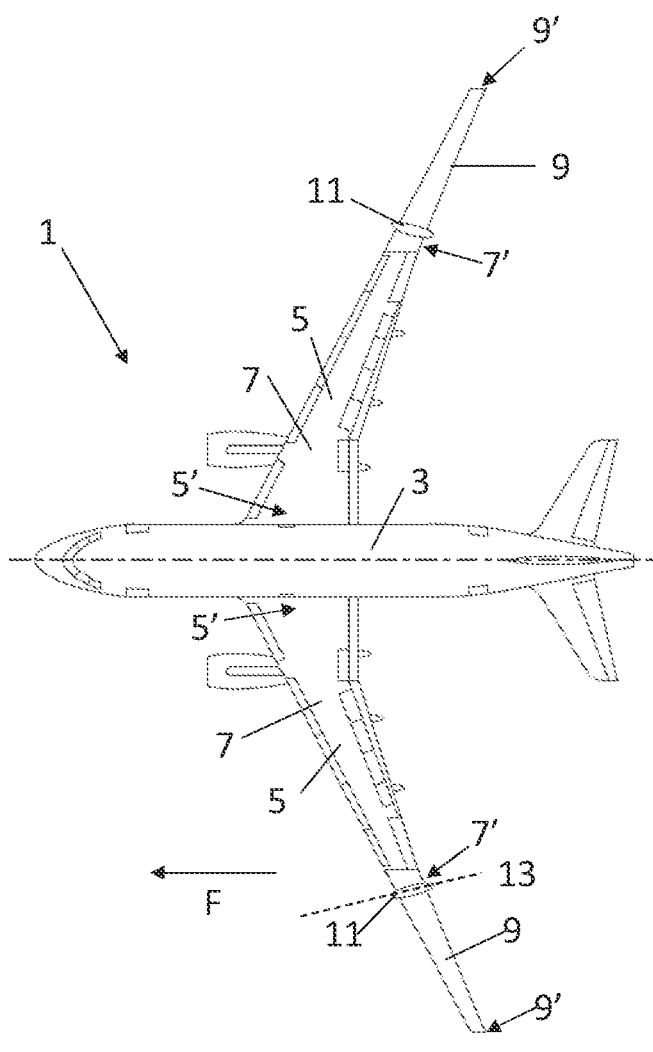
FIG. 1 shows a plan view of an aircraft with a folding wing tip device and a hinge arrangement and fairing.

FIG. 1 is a plan view of an aircraft 1. The aircraft comprises a central fuselage 3 and two main wings 5 extending outwardly from respective wing roots 5'.

Each wing 5 comprises a main fixed wing portion 7 extending from the root 5' to the tip 7'. At the tip 7' of the main fixed wing portion 7, the wing 5 also comprises a moveable wing tip device 9, in the form of a planar wing tip extension.

The wing tip device 9 is rotatably mounted about a hinge arrangement 11. The wing tip device 9 is configurable between a flight configuration and a ground configuration. In the flight configuration, as shown in FIG. 1, the wing tip device 9 is an extension of the main fixed wing portion 7. Accordingly, the upper and lower surfaces of the main fixed wing portion 7 are substantially continuous (save for the hinge arrangement 11) with the upper and lower surfaces of the wing tip device 9. The wing 5 has a leading edge 14 and a trailing edge 15. The leading and trailing edges of the main fixed wing portion 7 are also substantially continuous (save for the hinge arrangement 11) with the respective leading and trailing edges of the wing tip device 9. Such an arrangement is beneficial as it provides a relatively large wingspan, thereby providing an aerodynamically efficient aircraft.

Figure 5:
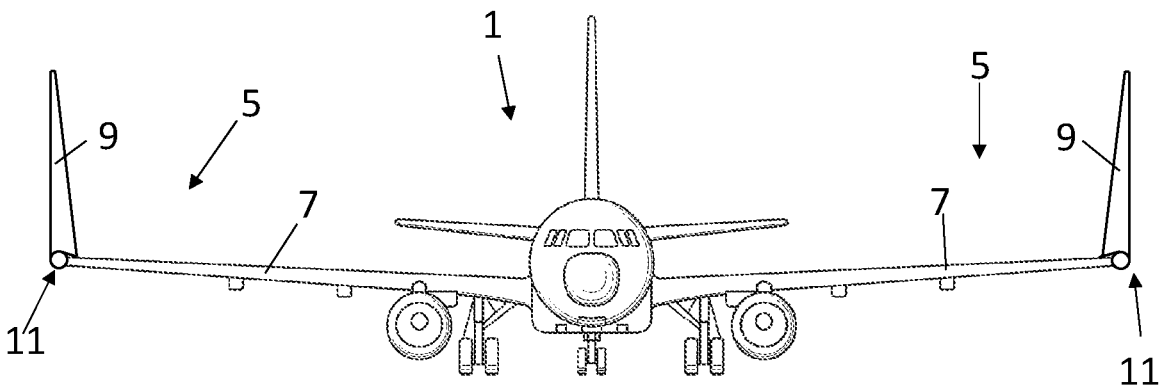
FIG. 5 shows a front view of the aircraft of FIG. 1 with the wing tip device folded.

However a large wingspan will not comply with certain airport compatibility gate limits, and so the wing tip device 9 is configured to fold upwardly to the ground configuration, as shown in FIG. 5. In the ground configuration the wing tip device 9 is moved away from the flight configuration such that the span of the aircraft wing 5 is reduced. The folding wing tip device therefore significantly increases the wingspan in the flight configuration for an aircraft that will fit within a smaller airport compatibility gate limit when in the ground configuration.

The hinge arrangement 11 connects the main fixed wing portion 7 and the wing tip device 9 and enables the wing tip device to rotate between the ground configuration and the flight configuration. The hinge arrangement 11 has a hinge line which may be orientated perpendicular to the swept mid-chord axis 13. The hinge arrangement may thus be non-parallel to the line of flight direction, F, i.e. 'flared' as shown in FIG. 1. Alternatively, the hinge arrangement may be aligned with the line of flight direction.

The aircraft wing 5 may be a swept transonic wing configured to experience transonic flow over the wing when in the flight configuration. The main fixed wing portion 7 may have a straight swept leading edge, and the wing tip device 9 may have a straight swept leading edge with the same sweep angle as the main fixed wing portion 7. The wing tip device 9 may be planar since the span constraint that typically affects aircraft wing design is negated by virtue of the upward folding of the wing tip device to the ground configuration, such that winglets, tip raking, tip rounding, wing fences etc. for vortex control at a tip 9' of the wing tip device 9 may not be required. The chord length at the tip 9' of the wing tip device 9 may be considerably shorter than typically found on a transonic aircraft wing. The short tip 9' may minimise vortex drag. The wing tip device 9 may have a straight leading edge up to the tip 9' of the wing tip device.

The large span of the wing tip device 9 may mean that the wing tip device has a span at least 15% of a total span of the aircraft wing 5, preferably at least 20%, preferably at least 25%, preferably at least 30%.

The main fixed wing portion 7 may have high lift devices at the leading and/or trailing edges, such as leading edge slats and trailing edge flaps, as well as other movable flight control surfaces such as ailerons. The wing tip device 9 may have no moveable flight control surfaces. This may help reduce bending moments on the hinge arrangement and simplify the hinge arrangement if services for wing movables do not need to traverse the hinge arrangement. Alternatively, the wing tip device 9 may have a moveable flight control surface.

The hinge arrangement 11 may be a motorised hinge for controlling the movement of the wing tip device 9 relative to the main fixed wing portion 7. The detail of the internal parts of the motorised hinge are not shown. The hinge arrangement 11 is in the general form of a leaf hinge with a leaf 19 having a plurality of knuckles 19a on the wing tip device 9 interleaved with a plurality of knuckles 17a of a leaf 17 on the main fixed wing portion 7. The leaves 17, 19 are structural elements within the profile of the wing 5 for transferring load into the structure of the wing on either side of the hinge arrangement 11. The knuckles 17a, 19a have an outer surface exposed on the upper surface of the wing 5 when the wing tip device 9 is in the flight configuration.

The knuckles 17a, 19a of the hinge arrangement protrude beyond an outer surface of the main fixed wing portion and wing tip device, i.e. the hinge arrangement is not contained within the profile of the wing 5 which extends generally continuously from either side of the hinge arrangement. The knuckles 17a, 19a are located between the leading and trailing edges 14, 15 of the wing 5, generally towards the leading edge 14. The knuckles 17a, 19a have an exposed outer aerodynamic surface.

A fairing 16 covers at least part of the hinge arrangement 11 on at least the upper (suction) side of the wing 5. The fairing 16 has an inboard portion 16a, and outboard portion 16b, a nose portion 16c and a tail portion 16d. The knuckles 17a, 19a may be closely stacked with no fairing portion between the knuckles. The fairing 16 may form a smooth outer aerodynamic surface with the knuckles 17a, 19a.

The fairing 16 may protrude beyond an outer surface of the main fixed wing portion and wing tip device on both the upper (suction) side and lower (pressure) side of the wing 5. The fairing 16 may also extend forward of the leading edges and aft of the trailing edges of the main fixed wing portion and wing tip device.

A diameter of the knuckles 17a and 19a of the hinge arrangement 11 is larger than will fit within the profile of the wing 5. This may be due to the comparatively large span of the wing tip device 9 as a proportion of the total wing span. The hinge arrangement 11 may comprise a locking mechanism arranged to lock the folding wing tip device into the flight configuration. Furthermore, the hinge arrangement 11 may be flared (non-zero hinge line angle) as mentioned previously. The hinge line may be at a non-zero angle to the wing chord at the tip of the main fixed wing portion, e.g. the angle may be at least 5 degrees, or at least 10 degrees, or at least 15 degrees. This may provide a semi-aeroelastic hinge effect as will be described below.

Whilst the hinge 11 may normally be locked such that the wing tip device 9 is co-planar with the fixed wing portion 7 when in the flight configuration, the hinge 11 may be capable of being unlocked when in the flight configuration. A gust load may cause the wing tip device 9 to fold upwardly when unlocked which, due to the inclined hinge line, has the effect of reducing the angle of attack of the wing tip device. This reduces the lift generated by the wing tip device 9 and therefore of the wing 5 as a whole. As the aircraft passes the gust the aerodynamically unloaded wing tip device can then passively rotate downwardly towards the flight configuration whereupon the locking arrangement can be moved back to the locked state.

The large size hinge arrangement knuckle diameter and/or the flare angle of the hinge arrangement mean that the size of the fairing presented to the oncoming airflow over the wing is relatively large. Whilst most aircraft fairings are generally sized to be as small as possible to reduce the aerodynamic impact of profile drag, the fairing 16 has a shape which is specifically designed to energise the airflow over the wing 5 and/or to entrain the flow to provide an aerodynamic benefit. In other words, the fairing 16 not only acts as a hinge fairing to smooth the airflow about the hinge arrangement 11 but acts as an aerodynamic device in its own right.

Accordingly, the fairing 16 may enclose a volume which is larger than is needed to accommodate the hinge arrangement components within the volume. The fairing 16 is designed to improve the aerodynamic behaviour of the outboard portion of the wing 5, including the wing tip device 9 and the outboard part of the main fixed wing portion 7 adjacent the hinge arrangement 11 and the fairing 16. In particular, the fairing 16 may have a shape which generates a profile drag greater than a smallest profile drag possible under the same flow conditions for a fairing sized to accommodate the hinge arrangement.

The fairing 16 may have a generally carrot shaped body which extends fore and aft of the knuckles 17a, 19a, an inboard portion 16a extending from the carrot shaped body to the main fixed wing portion 7, and an outboard portion 16b extending from the carrot shaped body to the wing tip device 9.

The faring 16 may be shaped to create a vortex to energise flow, energising the boundary layer and avoiding separation of the flow near the hinge. In this respect the fairing 16 may act similarly to a vortilon. The nose (forward) portion 16c of the carrot shaped body of the fairing 16 may extend forward of the leading edge of the fixed wing 7 and wing tip device 9. The nose portion 16c may be generally conical. The nose portion 16c may extend further forward than is necessary to just accommodate the hinge arrangement whilst maintaining streamwise flow at the design point of the aircraft. By elongating the nose portion 16c in this way, the fairing 16 acts similarly to a leading edge strake to energise the flow to prevent stall just outboard of the fairing 16.

The fairing 16 may further comprising a leading edge strake 16e between the leading edge 14 of the wing tip device 9 and the nose portion 16c of the fairing 16. The strake 16e may further assist in the creation of the vortex to energise the flow.

On the inboard side of the fairing 16 the leading edge 14 of the main fixed wing portion 7 creates a generally sharp edge with the nose portion 16c of the fairing 16. In this way, the fairing 16 may act similarly to a mid-span wing fence, assisting low speed aerodynamic behaviour by reducing outboard wing spanwise flow, improving takeoff and landing performance through improved stalling behaviour by limiting the area of the wing across which stall can propagate.

The tail portion 16*d* of the carrot shaped body of the fairing has a tapering cone about the hinge line aft of the hinge knuckles 17*a*, 19*a*. On either side of the knuckles 17*a*, 19*a* and on either side of the tail portion 16*d* the fairing is shaped with a concave surface towards the intersection of the fairing with the upper surfaces of the main fixed wing portion 7 and the wing tip device 9. The cone extends beyond the trailing edge 15 to a point.

Figure 2:
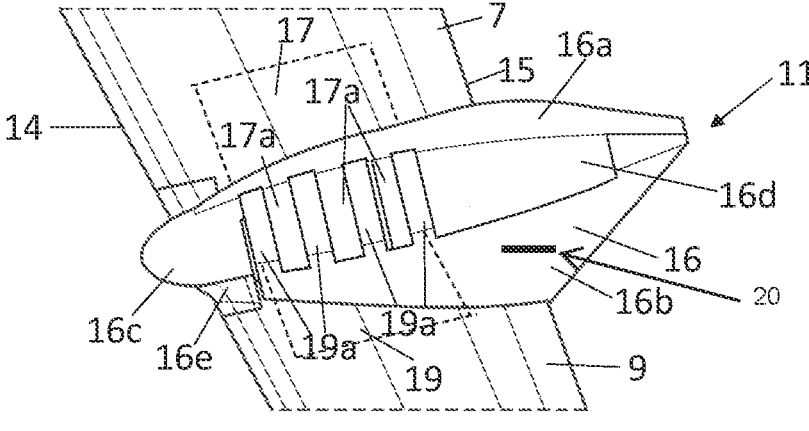
FIG. 2 shows a detail plan view of the hinge arrangement and fairing.

The intersection of the inboard portion of the fairing 16 with the upper surface of the main fixed wing portion 7 may follow a curve that tracks closely to the hinge knuckles 17*a*, 19*a* near the leading edge then moves slightly way from the hinge line to meet the trailing edge 15 of the main fixed wing portion 7 at approximately a right angle. From the intersection with the trailing edge 14, the trailing edge of the inboard portion of the fairing may cut back to the hinge line in plan view, as shown in FIG. 2. If this cut back would foul with any of the internal components of the hinge arrangement, the trailing edge of the inboard portion of the fairing may be cut back to a point on a line extending inboard and perpendicular to the hinge line at the rearmost end of the tail portion 16*d*.

The intersection of the outboard portion of the fairing 16 with the upper surface of the wing tip device 9 may follow a curve that extends away from the hinge line progressing from the leading edge 14 and is approximately aligned with the line of flight up to the trailing edge 15 of the wing tip device 9. Some aerodynamic shaping may be desirable to take this curve slightly away from being a straight line in the line of flight direction. Since the hinge axis is skewed to the line of flight direction F but the outboard fairing portion 16*b* has a shape which generally follows the line of flight direction, the outboard fairing portion 16*b* is larger than is needed to just accommodate the hinge arrangement components within the fairing volume.

This fairing shape helps with building the vortex created just outboard of the fairing 16 near the leading edge 14, such that the vortex grows towards the trailing edge 15 on the outboard side of the fairing 16. This vortex helps prevent stall just outboard of the fairing 16, over the wing tip device.

From the intersection of the fairing 16 with the upper surface of the wing tip device 9 at the trailing edge 15, the outboard portion of the fairing 16*b* may then cut back in a straight line to a point coincident with the hinge axis so as to form the outboard side of the rear portion 16*d* of the fairing.

Figure 3:
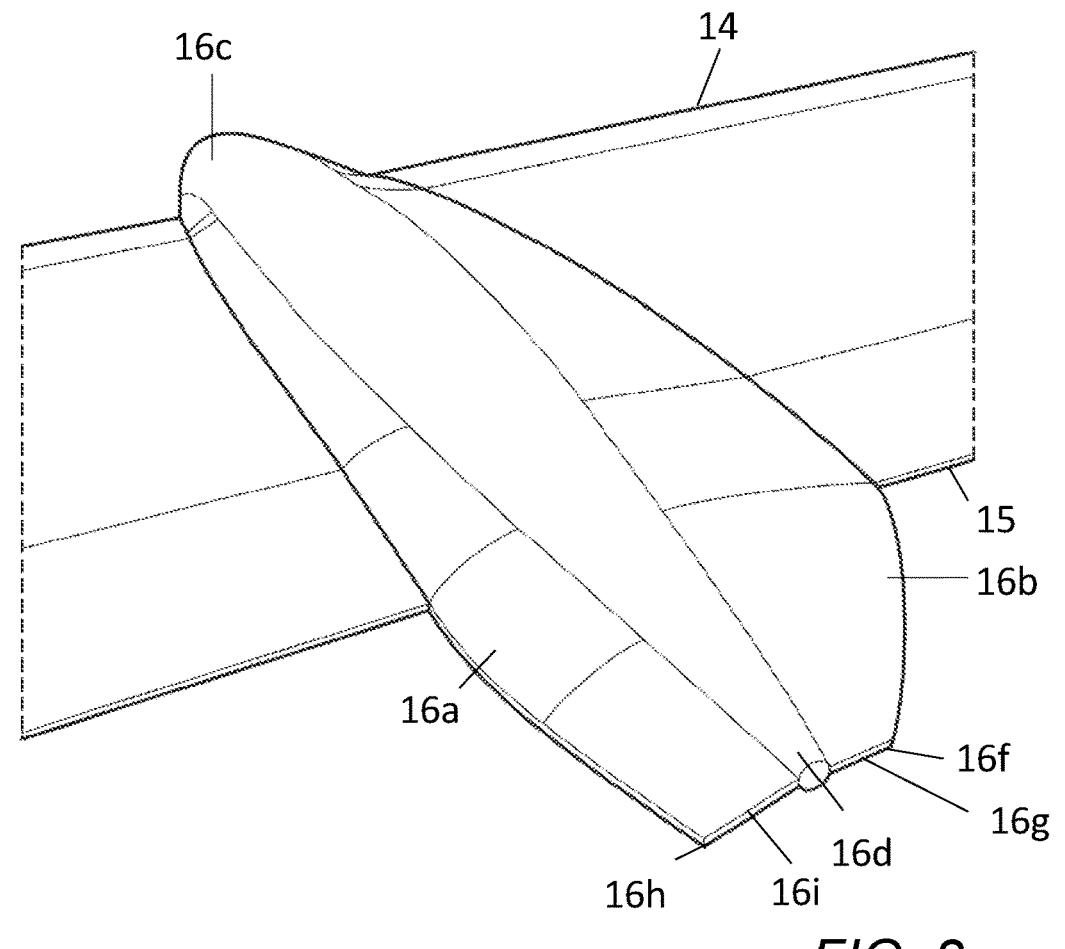
FIG. 3 shows a perspective view looking forward from above of the aerodynamic shape of another variant of the fairing.
Figure 4:
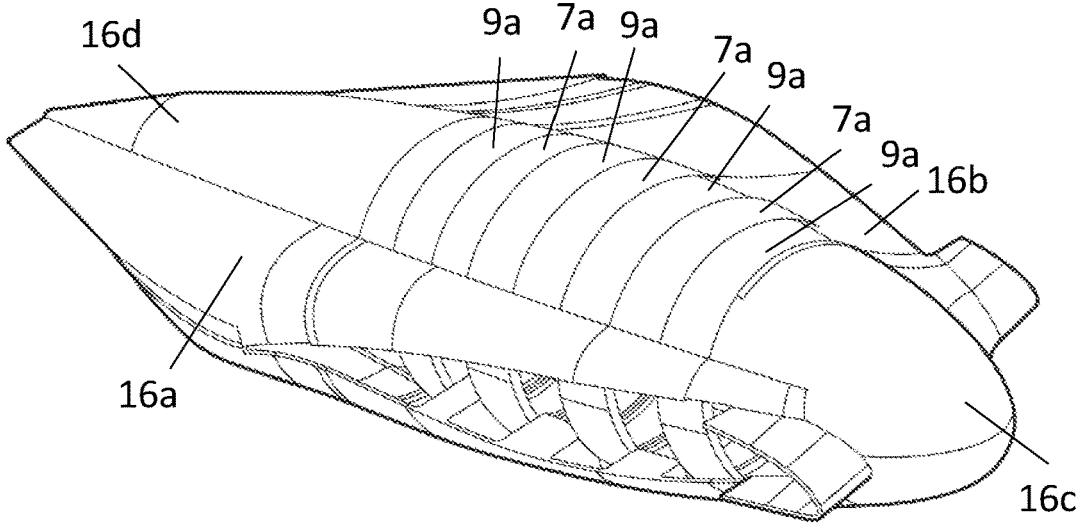
FIG. 4 shows a perspective view looking aft from above of the fairing and exposed hinge arrangement of FIG. 2 with the fixed wing portion and wing tip device removed.

Alternatively, as shown in FIG. 3, the rear of the outboard fairing portion 16*b* aft of the trailing edge 15 may continue to an apex 16*f* some distance behind the trailing edge of the wing tip device 9, and the outboard portion 16*b* may have a straight trailing edge 16*g* between that apex 16*f* and the rearmost end of the tail portion 16*d* of the carrot shaped body of the fairing. The outboard fairing portion 16*b* may then have a shape which tends towards a flat plate at the fairing trailing edge.

The rear of the inboard portion 16*a* of the fairing aft of the trailing edge 15 may similarly continue to an apex 16*h* some distance behind the trailing edge of the main fixed wing portion 7, and the rear of the inboard portion 16*a* of the fairing may have a straight trailing edge 16*i* between that apex 16*h* and the rearmost end of the tail portion 16*d* of the carrot shaped body of the fairing. The distance between the hinge line and the apex 16*i* may be greater than for the fairing in FIG. 2. The inboard fairing portion 16*a* may then have a shape which tends towards a flat plate at the fairing trailing edge.

Due to the different shapes of the inboard 16*a* and outboard 16*b* portions of the fairing 16, the fairing is shaped to be asymmetric in planform view with respect to the hinge line. The fairing asymmetry comprises a larger volume enclosed by the fairing outer surface on the outboard 16*b* (wing tip device) side of the fairing than on the inboard 16*a* (main fixed wing portion) side of the fairing. The maximum width of the outboard portion of the fairing may be at least 2 times the maximum width of the inboard portion of the fairing, preferably at least 3 times, where this width is measured from the intersection with the wing/wing tip device upper surface to the carrot shaped body of the fairing.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing comprising a main fixed wing portion and a wing tip device at a tip thereof, wherein the wing tip device is configurable between a flight configuration and a ground configuration, in which ground configuration the wing tip device is moved away from the flight configuration such that the span of the aircraft wing is reduced, the aircraft wing further comprising:

a hinge arrangement connecting the main fixed wing portion and the wing tip device and for enabling the wing tip device to rotate between the ground configuration and the flight configuration, wherein the hinge arrangement protrudes beyond an outer surface of the main fixed wing portion and wing tip device;

a fairing covering at least part of the hinge arrangement on at least a suction side of the wing, wherein the hinge arrangement has a hinge line, and wherein the fairing is shaped to be asymmetric in planform view with respect to the hinge line; and, wherein the fairing asymmetry comprises a larger volume enclosed by a fairing outer surface on the wing tip device side of the fairing than on the main fixed wing portion side of the fairing.

2. The aircraft wing according to claim 1, wherein the hinge arrangement includes a plurality of knuckles fixed to the fixed wing, and a plurality of knuckles fixed to the wing tip device, the knuckles protruding beyond an outer surface of the main fixed wing portion and wing tip device and having an exposed outer aerodynamic surface.

3. The aircraft wing according to claim 2, wherein the fairing forms a smooth outer aerodynamic surface with the knuckles.

4. The aircraft wing according to claim 1, wherein the main fixed wing portion has a straight swept leading edge, and the wing tip device has a straight swept leading edge with the same sweep angle as the main fixed wing portion.

5. The aircraft wing according to claim 1, wherein the wing tip device is planar, and wherein the wing tip device has a straight leading edge up to a tip of the wing tip device.

6. The aircraft wing according to claim 1, wherein the wing tip device has a span and the span of the wing tip device is at least 15% of a total span of the aircraft wing.

7. The aircraft wing according to claim 1, wherein the fairing is shaped to i) create a vortex to energise flow and/or ii) reduce outboard spanwise flow over the wing tip device adjacent the fairing.

8. The aircraft wing according to claim 1, wherein a generally carrot shaped body of the fairing has a forward portion which extends forward of the leading edge of the fixed wing and wing tip device.

9. The aircraft wing according to claim 8, further comprising a leading edge strake between the wing tip device leading edge and the forward portion of the fairing.

10. The aircraft wing according to claim 1, wherein an outboard portion of the fairing meets an upper surface of the wing tip device along a line generally aligned with a line of flight direction.

11. The aircraft wing according to claim 1, wherein an outboard portion of the fairing has a trailing edge which extends in a straight line from the trailing edge of the wing tip device at the intersection of the outboard portion of the fairing with the upper surface of the wing tip device up to a rearmost end of a generally carrot shaped body.

12. The aircraft wing according to claim 1, wherein the hinge arrangement has a hinge line at a non-zero angle to the wing chord at the tip of the main fixed wing portion, and wherein the angle is at least 5 degrees.

13. The aircraft wing according to claim 1, wherein the hinge arrangement is lockable in the flight configuration, and wherein the hinge arrangement is configured to be unlocked from a locked condition when in the flight configuration to enable the wing tip device to move passively under aerodynamic load.

14. The aircraft wing according to claim 1, wherein the wing tip device has no leading edge high lift device.

15. The aircraft wing according to claim 1, further comprising a vortex generator mounted on the fairing.

16. The aircraft wing according to claim 1, wherein the fairing has a shape which generates a profile drag greater than a smallest profile drag possible under the same flow conditions for a fairing sized to accommodate the hinge arrangement.

* * * * *